Fig. 3a1

Inventor
Harold J. Graham
by Roberts, Cushman & Grover
Attys.

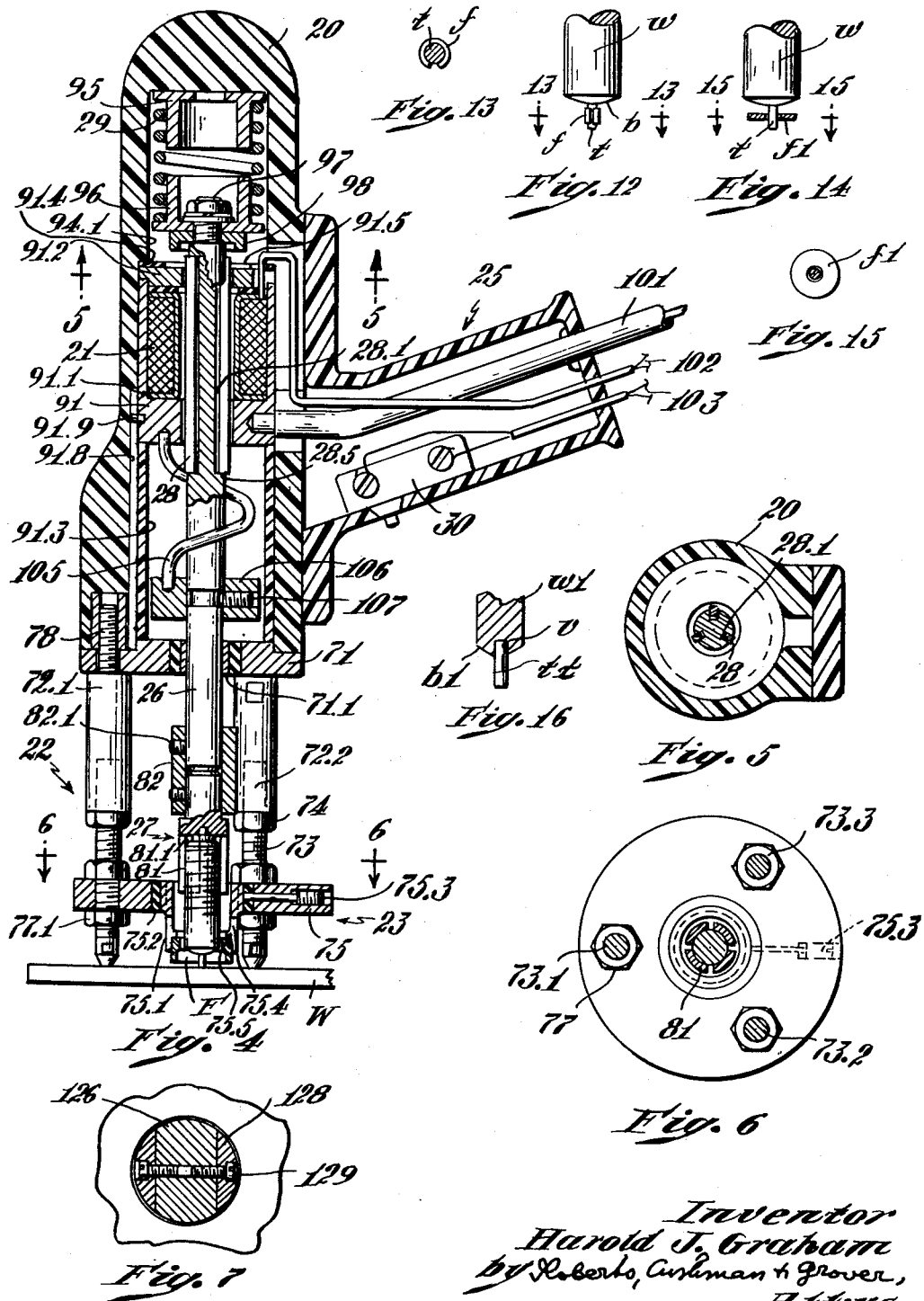

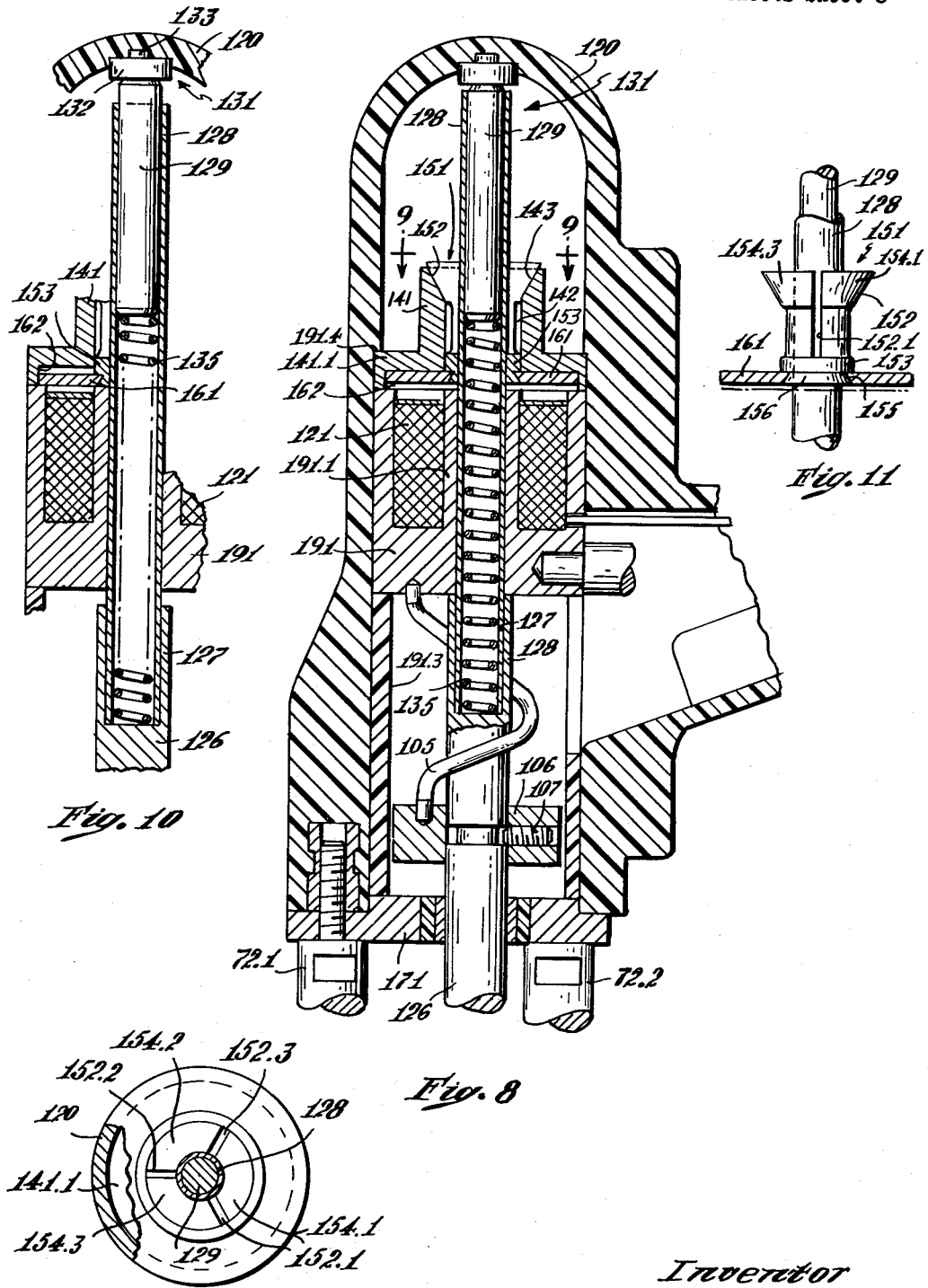

United States Patent Office 3,047,711
Patented July 31, 1962

3,047,711
ELECTRIC WELDING SYSTEM
Harold J. Graham, Sharon, Mass., assignor, by mesne assignments, to Omark Industries, Inc., Portland, Oreg., a corporation of Oregon
Filed Sept. 8, 1958, Ser. No. 759,583
7 Claims. (Cl. 219—99)

The field of the present invention is generally that of electric welding systems of the type wherein an arc is formed between two work-pieces which are to be joined whereupon the two work-pieces are contacted.

Objects of the present invention are to provide improvements as to ease of operation and applicability to more varied requirements, of welding systems of the general type described in my Patents Nos. 2,518,463 and 2,685,630 rendering such systems more versatile, to provide particularly strong and clean welded joints between flat metal surfaces such as plates or sheets and stud shaped components extending therefrom, to provide a very simple, rugged and yet fully reliable system for the initiation of a welding arc, the application of a welding impulse and the contacting, in many instances pressurably, of two work-pieces the opposite surfaces of which have been fused by the arc, and to provide components such as stud tip structures, ferrules, and ferrule holders that are particularly suited for although not always necessary in carrying out the new welding technique.

A brief summary of the invention will serve to indicate its nature and substance in some of its principal aspects for attaining the above objects, as follows.

In one of these aspects the invention concerns a method of pressurable arc welding to join two work-pieces, which method includes the steps of initially contacting the two work-pieces, of applying a welding current to the work-pieces while firmly maintaining the initial relative position of the two pieces so that an arc will form which melts adjacent metal portions of the two work-pieces, and of thereupon contacting the work-pieces to join them at the melted portions. In a preferred embodiment, the welding current is applied not only during the maintenance of the initial position until adjacent portions of the work-piece are melted but also for a subsequent period when they are in full contact. While considerable force is preferably applied for contacting the work-pieces, this contact is not necessarily percussive or in the nature of a hammer blow.

In a practically important embodiment of the invention as applied to a stud shaped work-piece and a flat work-piece, the metal flow is controlled and the arc maintained while bases are released during the entire welding procedure, by surrounding the welding zone with a refractory chamber such as provided by a simple ferrule dimensioned, and held to present a predetermined exit or venting area to these gases; this venting area is predetermined, according to the invention by a gap between the end face of the ferrule and the flat work piece, or by a gap surrounding the stud-shaped work-piece at the other end of the ferrule, or by both gaps.

The method according to the invention is particularly applicable to studs which are provided with tips that are dimensioned in accordance with the principles set forth in my Patent No. 2,518,463, and for certain purposes the effect of such tips is enhanced, in accordance with the invention, by making the stud base conical, or by making the tip of a specially selected material other than that of the stud proper (herein referred to as dissimilar tip), or by applying an auxiliary body to the tip (herein referred to as compound tip)—any one or any combination of these components being used when desirable, and mutually coordinated by appropriately dimensioning the components and timing the welding steps; the purposeful selection and correlation of these expedients permits the application of the present invention to most diverse practical situations, although it should be understood that these features are valuable also within other welding cycles of this general nature.

In another important aspect, the system according to the invention introduces a device for controlling a welding cycle which includes establishing arc initiating contact between two work-pieces to be joined, arc maintenance, and subsequent exertion of pressurable contact for completion of the weld, which device comprises a positively controlled instrumentality, preferably an electromagnetic clutch, for maintaining the relative position of the two work-pieces as established by the initial contact, electrically actuated and controlled means for applying welding current to the work-pieces shortly after actuation of the position maintaining instrumentality, and provisions for releasing the position maintaining means after a predetermined time thereupon to permit exertion of the pressurable contact; the initially contacting and finally pressure exerting means are preferably the same, the electrically controlled position maintaining instrumentalities being independent of these initially contacting and later force exerting means.

In a further practical aspect, the invention introduces welding apparatus which comprises a mounting casing with means for distancing the casing from the stationary, usually flat, work-piece, a rod member mounted on the casing for axially sliding movement and with one end extending therefrom at the welding end of the casing, force exerting such as spring means for yieldingly urging the rod member to move outwardly from the welding end, arresting means such as an electro-magnetic clutch for releasably fixing the rod member relatively to the casing, means for supplying welding current to the rod member, and chuck means for attaching a work-piece such as a stud to the extending end of the rod member; in important practical embodiments this apparatus further includes means, preferably of highly heat conductive material, for attaching a welding ferrule to the casing in predetermined position relatively to the distancing means and hence to the flat work-piece. The electro-magnetic clutch has preferably a magnetic armature which is fastened to the rod with or without radial movement such that energization of a solenoid that is fastened to the casing around the armature attracts the latter to pole shoes that are associated with solenoid and casing and fixates the rod relative to the casing whereas de-energization of the solenoid releases the rod.

For the electric control of apparatus such as shortly characterized above, the invention introduces a normally deenergized electric clutch for fixating the relative position of the two work-pieces, actuating means for energizing the clutch, a normally open main relay for opening and closing the circuit of the welding current, a normally open short delay relay energized by the actuating means for energizing the main relay to close the welding current circuit after a short interval from its own energization and for de-energizing the main relay to open the welding current circuit shortly after its own de-energization, and a normally closed long delay relay energized by the actuating means for de-energizing the electric clutch after a predetermined delay from its energization.

The above-mentioned tipped stud shaped work-piece takes for certain purposes the form of an elongate stud shaped member having at one end a wire shaped tip of a diameter which is reduced as compared to that of the stud shaped member proper to a degree causing it to disintegrate and to initiate an arc upon being subjected to electric energy that is sufficient to weld the two workpieces together, and frictionally applied to the tip a small self-supporting body of solid flux material, which in a specially practical embodiment of such a compound tip consists of a rolled aluminum tube which is longitudinally slotted and which, being somewhat shorter than the tip, is pressurably engaged thereon. As likewise mentioned above, the invention includes studs with dissimilar tips of especially selected material and dimensions, and ferrules which are distanced from the flat work-piece without interruption along the lower rim that faces the flat work-piece, or which are distanced along the lower rim as well as around the stud at the other end of the ferrule, or which are distanced only around the stud.

Other objects and aspects of novelty in addition to those referred to above will appear from the herein presented detailed description of a practical embodiment of the invention illustrating its novel characteristics.

The description refers to drawings in which—

Figure 1:
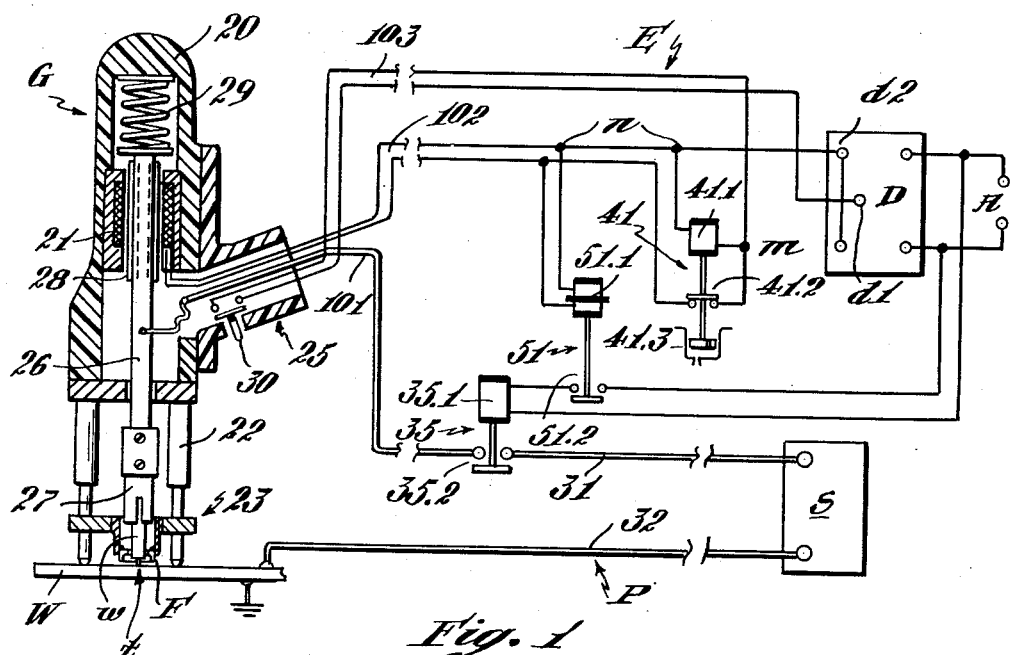
FIG. 1 is a schematical representation of a complete device for carrying out the present welding technique.
Figures 3A, 3B, 3C, 3D, 3E:
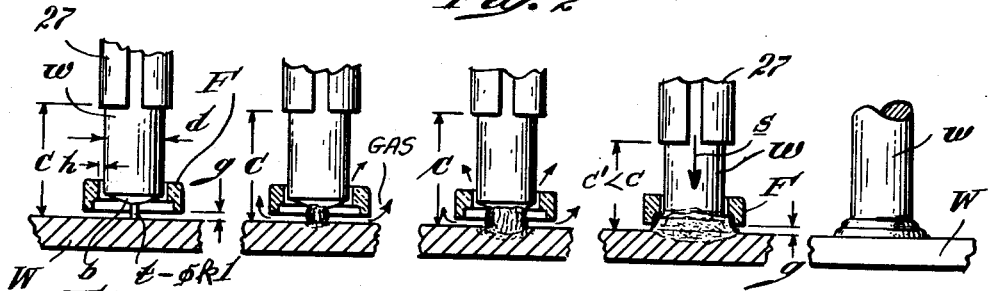
FIGS. 3a to 3e are diagrammatical representations of the consecutive welding steps according to the process illustrated in FIG. 2.

FIG. 3a1 illustrates a modification of the steps shown in FIGS. 3a to 3d;

FIG. 4 is a longitudinal section through an actual welding gun of the type that is schematically shown in a similar section in FIG. 1;

FIG. 5 is a section on lines 5—5 of FIG. 4;

FIG. 6 is a section on lines 6—6 of FIG. 4;

FIG. 7 is a section similar to that according to FIG. 5 but showing a second embodiment of the clutch component of the welding gun;

FIG. 8 is a longitudinal section with the plunger stem in elevation, but otherwise similar to FIG. 4, through a third embodiment of welding guns according to the invention;

FIG. 9 is a section on lines 9—9 of FIG. 8;

FIG. 10 is an elevation with the plunger stem in elevation, of the clutch portion of the gun as shown in FIG. 9, but with the plunger rod lowered;

FIG. 11 is an elevation of the split clutch armature shown in section in FIG. 8;

FIG. 12 is an elevation of a tipped stud having a fluxing tube applied thereto;

FIG. 13 is a section on lines 13—13 of FIG. 12;

FIG. 14 is an elevation, with the flux disc in longitudinal section, of a second embodiment for a fluxed tip;

FIG. 15 is a section on lines 15—15 of a tip according to FIG. 14; and

FIG. 16 is a longitudinal section through a welding stud having an inserted tip of especially selected material.

It should be noted that decimal numbers are herein used to denote members of a group of similar function or components of an assembly, and that the integer member is sometimes used for shortly denoting several members of the group or assembly.

The description of this preferred embodiment of the invention will initially refer to the schematic representations of FIGS. 1 to 3e, the mechanical details of the welding device will then be explained more in detail with reference to FIGS. 4 to 6, and finally several modifications and extensions will be described.

In FIG. 1, W represents a flat work-piece and w a stud shaped work-piece which is to be welded to the flat piece W and is surrounded by a ferrule F. As shown in FIG. 3a, the stud w is provided with a tip t which is basically constructed in accordance with the principles set forth in my above-identified Patent No. 2,518,463, but can be modified as will be described hereinbelow. G designates the welding device proper, commonly referred to as gun, S designates a source of welding current, such as a conventional welding generator with drooping voltage characteristic and supplying welding current of approximately 90 volt maximum to the welding circuit P, A designates a source of alternating current of standard voltage, D designates a rectifier supplying at terminals d1 and d2 direct current of a voltage suitable for operating the control apparatus, and E is the control apparatus.

The gun G has a casing 20 for example of insulating plastic material; if made from metal it is insulated from the electrically conducting parts contained therein. On this housing are mounted distancing means 22 which carry ferrule holding means 23, a handle 25 with switch 30, a plunger rod 26, a stud chuck 27, a clutch assembly with a solenoid 21 fixed to the housing and an armature 28 fixed to the plunger rod, and a plunger spring 29.

The main welding circuit P leads from source S through conductors 31 and 32, by way of the normally open relay switch 35.2, to the plunger rod 26 and the stud w on the one side and to the work-piece W on the other side of the welding area. The chuck 27 holds the stud w, and the ferrule holder 23 confines the ferrule F.

The control circuit which is in the present embodiment used for carrying out the procedure according to the invention (but which can be replaced by any programing device suitable for carrying out the necessary operations) consists of connections which lead from terminal d1 through the normally open, manually operated switch 30 (herein indicated by way of example as a push button switch on the handle 25) to a junction marked m which corresponds to a second junction, marked n, directly connected to the second direct current terminal d2. A long delay relay 41 is with its solenoid 41.1 connected across junctions m and n. The delayed opening of this relay is indicated by a dash pot 41.3, and the function of its delay period within the working cycle as a whole will be explained hereinbelow. A short delay relay 51 is with its solenoid 51.1 connected in a short delay circuit which leads from junction m through the normally closed switch 41.2 of the long delay relay 41, through 51.1, to junction n. The closing of switch 51.2 as well as its opening are shortly delayed within the working cycle in a manner which will also be explained hereinbelow. The above-mentioned main welding switch 35.2 is actuated by the solenoid 35.1 of the main relay 35 which is energized directly from the alternating current supply A by way of the normally open switch 51.2. The clutch solenoid 21 is connected between d1 and d2 through 30 and normally closed 41.2, so that it will be energized immediately upon the closing of 30.

Referring now to FIGS. 2 and 3a to 3e, the welding procedure according to the invention takes place as follows. A tipped welding stud w, constructed as mentioned above and to be further described below is inserted in the chuck 27—the spring 29, the spacers 22 and the ferrule holder 23 having been adjusted such that the spring 29 will be compressed to a predetermined degree when the spacers and tip t of the stud w are contacted with the plate W, and such that the ferrule F assumes a distance g from W (FIG. 3a), or essentially contacts it (FIG. 3a1), according to the principles which will be explained below. At this stage the solenoid 21 of the clutch 28 is de-energized and the spring 29 compressed by the tip t bearing against the surface W, and the ferrule F has the above mentioned relation to W.

The operator now depresses the switch 30 thereby immediately energizing the clutch solenoid 21 and the relay 51.1 through the normally closed switch 41.2. The armature 28 is attracted and the welding rod 26 immediately arrested in the position which it has assumed when the tool was placed on the welding surface W. The short delay solenoid 51.1 having been energized through the still closed switch 41.2 by closing the switch 30, the switch 51.2 closes shortly thereafter energizing solenoid 35.1 of relay 35 and closing the main switch 35.2. As current begins to flow through the tip t, the latter will immediately evaporate due to the heat developed by the high current density therein and ionize the gap now existing, upon the tip's evaporation, between the base of the stud shank proper and the surface W. Due to this ionization, an arc forms, as indicated in FIG. 3b. The mixture of gases formed under pressure due to the evaporation of the tip and the metal in the region generally as well as the ionization of the ambient atmosphere will escape at the bottom of the ferrule where it is spaced by the gap $g$ from the surface W, and also through the annular gap $h$ around the stud. Both escape paths are indicated in FIGS. 3a to 3d, it being assumed that the stud shown in these figures is thicker than about five-sixteenths of an inch, for the reason to be explained below. With the arc fully established as indicated in FIG. 3c, gas continues to escape, and the metal at the opposite surfaces of the welding region begins to melt. It was found that the arc forming can be effectively controlled, for purposes of this welding procedure, by making the stud base $b$ slightly conical, as indicated in all figures, although this modification is not essential and flat stud bases produce satisfactory results in most instances. It will be remembered that the relative positions of the two work-pieces $w$ and W and of the ferrule F remain unchanged throughout these phases of the welding operation since the plunger rod 26 is still fixed by the clutch 21, 28 to the casing 20 and the latter rests on the work-piece W with its distancers 22.

After a predetermined period the long delay solenoid 41.1 opens the switch 41.2, de-energizing the clutch solenoid 21 and suddenly permitting the spring 29 to press the melted base of the stud $w$ into the opposite melted surface of the plate W. This phase is shown in FIG. 3d, the downward movement of the stud being indicated by arrow $s$. After another period, during which current is still flowing which is determined by the short time delay that is built into the relay 51, solenoid 51.1 opens switch 51.2, de-energizing solenoid 35.1, causing switch 35.2 to open and thereby cutting off the welding current. The short continuance of the welding current flowing, during the short time delay 3d provided by relay 51, through the closely joined pieces $w$ and W promotes a clean weld without essential irregularities, as indicated in FIG. 3e. This prolonged current flow maintains the arc until the gap is fully closed and the metallic joint completed.

The above described cycle and its operational significance will become quite clear from the following recapitulation referring to FIG. 2 wherein the salient points of transition between the consecutive steps, and the approximate relative lengths of the significant phases are clearly indicated as follows. The initial period of indefinite length lasts from the seating of the tool until the switch 30 is closed by the operator. Period 3a now begins, and the physical conditions prevailing during that period are illustrated in FIG. 1 and somewhat more in detail in FIGS. 3a and 3a1. These figures also indicate the initial stud position by the free stud extension $c$ from the end of the chuck 27 to the end of the tip $t$—an axial distance $g$ representing the gap between the ferrule F and the work-piece W—and a radial width $h$ representing the annular gap between the stud $w$ and the ferrule F. Actual values of these dimensions for a characteristic embodiment will be given below.

Figure 2:
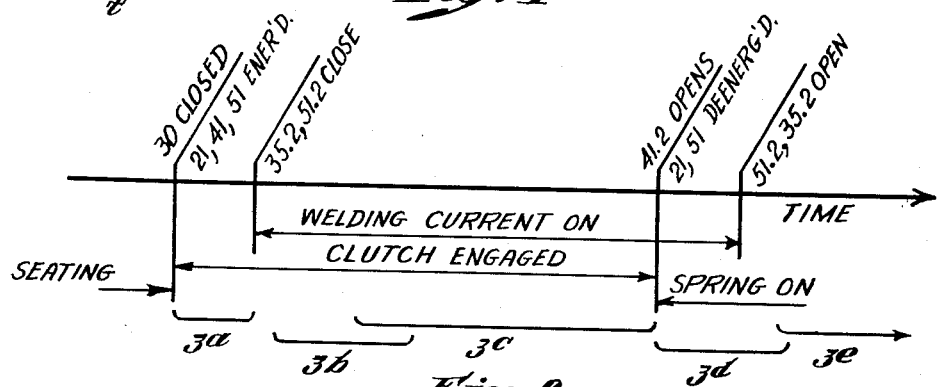
FIG. 2 is a time diagram of the welding process according to the invention.

FIGURE 2 also indicates the fixation of the rod 26 by the engaged clutch 21—28, with the stud $w$ in the position which was determined by the contact between the stud tip $t$ and the work-piece W. Further indicated is the energization of relays 41 and 51 and the delay in closing switches 35.2 and 51.2 at the end of period 3a. The physical condition during this period, marked 3a in FIG. 2, is illustrated in FIG. 3a.

When the short delay switch 51.2 closes, solenoid 35.1 of relay 35 is energized and immediately closes switch 35.2 which initiates the flow of the main welding current from source D. The preliminary welding period begins with an arc forming, and gas escaping as indicated at 3b; this period leads into the period 3c when the arc widens without wandering, a good deal due to the conical form of the base $b$ of the stud. After a predetermined long delay the relay coil 41.1 opens the switch 41.2, de-energizing relay 51 and clutch coil 21, and initiating the period 3d. While the clutch magnet 21 immediately releases the rod 26 and permits the spring 29 to work, the switch 51.2 does not yet open since the above-mentioned short delay of the relay 51 affects both closing and opening of switch 51.2. The following period during which the stud is pressed towards the plate, while the welding current is still flowing, is marked 3d in FIG. 2 and is illustrated in FIG. 3d wherein arrow $s$ indicates the downward pressure on the stud due to the spring 29, which causes the melted base $b$ of the stud and the oppositely melted portion of W to amalgamate, as indicated in FIG. 3d by the distance $c'$ that is smaller than the initial free stud extension $c$. Especially during this period, the ferrule F provides a clean fillet and prevents splattering due to the mechanical shielding action of the ferrule proper. It will be noted that the distances $g$ and $h$ between the ferrule and the two work-pieces are maintained during the entire process including period 3d when the welding current is still on; this provides a clean and uniform weld that is essentially free of harmful oxide or other inclusions within its metal, for reasons to be discussed hereinbelow. The welding current is interrupted when the short time delay switch 51.2 opens, de-energizing solenoid 35.1 and opening switch 35.2. As indicated by the bracket 3d of FIG. 2 extending beyond the disconnection of the welding current proper, the welding tool is not yet withdrawn. As the end of period 3d, that is after a short non-critical time 3e from the moment when the welding current is cut off, the weld is finished and the gun can be withdrawn and the ferrule disposed of, the weld being now finished as indicated in FIG. 3e.

The detail construction of a welding gun according to the present invention and especially suitable for carrying out the above described process will now be described with reference to FIGS. 4 to 6.

As mentioned with reference to FIG. 1, the welding device has a housing 20 preferably made of plastic material. To this housing are attached, by means of a metal plate 71 with an appropriate bushing 71.1 for the plunger rod 26, three distancing legs 72.1, 72.2 and 72.3. The legs 72 are screwed into the housing as indicated by means of an insert of the plastic housing, as clearly shown at 78 of FIG. 4. The length of these legs can be adjusted by means of pointed distancing screw spindles 73 threaded into a respective leg 72 and locked thereto by means of nuts 74.

The ferrule holding device 23 consists in this embodiment of a plate 75 wherein a depending sleeve 75.1 is held within a bushing 75.2 by means of an adjusting set screw 75.3. As indicated at 75.4 this sleeve is slotted and has an inside bead 75.5, so that the ferrule F can be easily secured therein at a definite position. It will be evident that this ferrule holding sleeve can be conveniently exchanged by means of the set screw 75.3, in order to accommodate ferrules of different dimensions. The position of the ferrule holding plate 75 on the spindles 73 can be adjusted by means of six nuts 77. The sleeve 75.1 is preferably made of copper.

The chuck 27 has a slotted stud holder 81 with a seating insert 81.1, and is fixed to the plunger rod 26 by means of a sleeve 82 with set screws 82.1 which permit easy exchange of the chuck proper in order to accommodate studs of various dimensions.

The magnetic clutch which, as mentioned above, has as main components a solenoid 21 and an armature 28, further comprises in this embodiment a magnetic circuit element 91 consisting of a pot shaped portion 91.1 and a magnetic plate 91.2 which are held between a plastic sleeve 91.3 and an inside shoulder 91.4 and a washer 91.5 of the housing proper. The solenoid coil 21 is mounted therebetween in conventional manner with proper insulation.

The spring 29 rests between two spring holders, 95 resting on the housing 20, and 96 being fastened with a nut 97 to the threaded end of piston rod 26. A distancer 98 provides an exchangeable means for adjustably limiting the travel of the spring and therefore of the piston rod 26. It will be noted that the spring 29 provides the initial contact during the period marked "seating" in FIG. 2, and that it also provides during the period 3d the force which contacts the stud and the flat welding piece. The spring is made strong enough to push the stud into the melted metal and soft enough not to crush the stud tip $t$ as the stud $w$ is initially seated on the work-piece W. Certain smaller differences in stud lengths can be accommodated by means of this spring without chuck adjustment.

The electric wiring is introduced through the switch holder 25 which can serve as a handle or can be modified for mounting the gun on a rigid support. The lead-in for the main welding current is indicated at 101 of FIGS. 1 and 4 and the wire pairs 102 and 103 are similarly indicated in these figures. The control switch 30 corresponds to the element similarly marked in FIG. 1. The conductor 101 is fastened to the magnetic element 91 and leads from there through a tail wire 105 to a sleeve 106 which is fastened to the plunger rod 26 by means of a set screw 107 extending into a neck of the rod.

As shown in FIG. 4, the magnetic element 91 is kept from turning within the housing 20 by means of a keyway 91.8 and a screw 91.9, and the clutch armatures 28 are similarly retained in keyways 28.1 machined into the rod 26. It will be evident that energization of the solenoid coil 21 will magnetize the magnetic circuit, represented by the pole shoe 91, the pot 91.1, and the plate 91.2, which will attract the armature keys 28 causing them to move outwardly to some extent within their keyways 28.1 and to firmly hold the rod 26 to the housing, since the keys have no axial travel being restrained in this respect by the ends of the keyways as indicated at 28.5. It is not absolutely necessary to have movable keys as above described, but a construction according to FIG. 7 will often serve the purpose by means of magnetic rods 128 which are screwed at 129 to the suitably flattened part 126 of the rod 26. The magnetic field can be made strong enough to arrest the rod 26 upon energization of solenoid 21, if this construction is used.

Instead of using a magnetic clutch with floating armature keys according to FIGS. 4 to 6 or a fixed armature according to FIG. 7, an electromagnetically actuated mechanical clutch can often be incorporated to particular advantage, and such an embodiment will now be described with reference to FIGS. 8 to 11. Since this embodiment differs from the first described embodiments mainly with regard to the clutch structure, the distancing legs, the stud chuck, and the ferrule holding device are not shown in these figures.

The housing 120 of this embodiment is quite similar to the housing 20 as shown in FIG. 4. The coil 121 and the magnetic circuit element or armature 191 are also generally similar to the corresponding parts 21 and 91 of FIG. 4 and they are similarly distanced from the base plate 171 by means of a plastic sleeve 191.3, but in this embodiment the element 191 has an inner sleeve 191.1. The connection for the main welding circuit to the electromagnetic iron core 191, the tail wire 105, the sleeve 106 and the set screw 107 are identical with the corresponding parts described with reference to FIG. 4.

The plunger rod 126 is in the present embodiment provided with an axially recessed portion or bore 127 to which is firmly fixed, such as by shrinking, a plunger tube 128 made of stainless steel or bronze. A plunger guide stem 129 is suitably fastened to the housing 120 at 131, for example by means of a rest 132 set in the housing 120, the stem 129 sitting with its reduced end 133 on the rest 132. While the plunger tube 128 is pressed into the axial bore 127 of the plunger 126 as mentioned above, its upper portion slides on the stem 129, a spring 135 supplying the force which urges the welding plunger 126 downwardly when released by the clutch.

A solid annular clutch wedging means or cam 141 is with its flange 141.1 held between the armature element 191 and the shoulder 191.4 of the housing 120. This annular clutch wedge has a cylindrical bore 142 and a conical cam portion 143. Within the cylindrical bore 142 slides a clutch sleeve 151 (FIG. 11) which has a conical portion 152 with slots such as 152.1, 152.2 and 152.3, reaching down to a solid ring portion 153 and forming resilient wings 154.1, 154.2, 154.3 whose outer ends can move slightly in lateral direction. Dovetailed at 155 into a conically recessed portion 156 of the ring 153 is an armature plate 161 whose periphery fits the recess 162 (FIGS. 8 and 10) of the flange 141.1, with sufficient play to permit movement in axial direction.

Normally, the armature plate is in the position shown in FIG. 8, with the clutch disengaged. When the coil 121 is energized and the magnetic circuit established, the armature plate 161 is attracted, the clutch sleeve 151 pulled downwardly, and the resilient conical wing portions 154.1, 154.2, 154.3 between the slots 152 are drawn into the conical cam or wedge portion 143 and moved upwardly, engaging the tube 128 which is thus firmly fixated relatively to the housing. Upon de-energization of the coil the armature plate 161 is released, and the spring action of the clutch sleeve wings moves the sleeve 151 upwardly by virtue of the wedge effect on the conical clutch cam face 143. The tube 128 is suddenly released and permitted to be moved downwardly by the spring 135.

It will now be evident that studs of different lengths can be used without necessarily adjusting the gun as above described, because the welding cycle is within a fairly wide range independent of the lengthwise mechanical dimensions of the gun structure. The air gap after arc formation and tip burning is determined only by the length of the initially contacted tip, due to the function of the clutch. Studs of different lengths might slightly change the spring pressure, but this can be compensated for by making the relation between spring excursion and spring force linear over a relatively wide range.

It will be noted that there is no mechanical link or lock between the moving piston rod 26 (FIG. 4) or 126 (FIG. 8) and the housing 20 or 120 respectively, the fixation of these two parts relatively to each other being purely electrical and not operating through a mere electrical release of a mechanical latching mechanism although, vice versa, the herein described electromagnetical clutch can be substituted for a mechanical latching device, for certain uses of guns of this type.

It will be further noted that, in the present embodiment, the switch 30 must be depressed by the operator throughout the entire welding cycle, which serves as a protective measure and is therefore preferred; it will however be evident that automatic holding instrumentalities, becoming effective after momentary actuation of a starting switch, can be used.

While, as will be described below, the present system lends itself well to the use of auxiliary media such as by way of studs with so called fluxing agents attached thereto, such expedients are not indispensable for the carrying out of the present system because its cycle does not depend on the drawing of an arc by pulling the stud away from initial contact with a second workpiece but is with certainty initiated by the disintegration of the tip and the gap ionization consequent thereto. The drawing of an arc by moving a tipless stud away from the stationary work-piece sometimes extinguishes the arc again while the stud is distanced from the plate and not yet in the pool of melted metal; with the arc extinguished and the metal not yet joined, contaminating gases including ozone which are inevitably present cause considerable deterioration of the weld if a counteracting auxiliary agent is not used in such previous systems.

In accordance with the present invention these and other detrimental effects incidental to the use of an arc can be essentially eliminated by means of ferrules which are peculiarly dimensioned and placed such as to take full advantage of the present welding cycle, wherein the tip is initially in contact, burns off to form and to maintain an arc, and the clutch is released only after the tip is completely burned off and the metal of both workpieces is melted while protected by a ferrule that is correlated to this cycle and to the various parameters involved including the timing, the welding current and the welded metals.

With regard to the function of ferrules within the orbit of the present invention it should be noted that the ferrule not only confines the liquid metal, but also acts as a cooling means and has an important function due to the peculiar arrangement and size of venting gaps, and the volume of the ferrule chamber.

Referring first to the cooling effect of the ferrule, this effect depends on the gap dimensions as well as on the cooling surface and mass of the ferrule and on the timing proper according to the particular job at hand, and is promoted by the intimate contact with the metallic ferrule holding device. It will be noted that a refractory ferrule of the herein illustrated type with a considerable mass surrounding the stud proper has a larger heating capacity than a ferrule which is restricted in the region around the stud. The cooling effect can be further controlled by way of the heat conductivity of the ferrule holder 75.1; for most purposes it is advantageous to promote such conductivity by making the holder of a highly heat conducting metal such as the abovementioned copper.

Referring next to the venting function of the ferrule, I have found that the gaps as well as the volume of the ferrule chamber have to be selected in accordance with the following considerations.

Upon the formation of an arc, with the stud tip and the atmosphere within the ferrule reacting with each other, an inert gas and vapor mixture forms under increasing pressure. If the ferrule is properly designed, the overpressure of the inert gas in the ferrule chamber is maintained throughout the welding cycle so that the atmosphere is effectively kept from the welding area which thus remains in the inert medium that was initially formed. Oxidizing and other detrimental atmospheric effects are thus substantially excluded. If the venting area is too large, not enough pressure is developed to exclude the atmosphere, and spongy or otherwise irregular welds result. If the venting area is too small, melted metal is often squirted out and there is even a tendency to extinguish the arc; a very large chamber might counteract these defects, but large ferrules are impractical and ineffective with regard to confining and cooling the metal.

In accordance with the present invention, two venting regions are available, namely the bottom gap $g$ (FIGS. 3a to 3d) and the top gap $h$ (FIGS. 3a, 3a1, 3b, to 3d). In the case of comparatively large studs, very approximately of more than three-eighths of an inch in diameter, both gaps, $h$ as well as $g$, are ordinarily used, because both are needed to provide sufficient venting area for the expanding and escaping gas volume which is comparatively large due to the larger metal mass, the greater amount of heat developed, and the higher temperature. If only a top gap $h$ of sufficient venting area were used, the metal would be blown out or flow out through it and clog it whereas, if only a large bottom gap $g$ of sufficient venting area were used, not only would most of the damming effect be lost but also the cooling effect at the weld. The utilization of both gaps offers considerable versatility of venting area control: the top gap $h$ can be built into the ferrules by making them of different diameter for each type and size of stud; the bottom gap $g$ can be preset by adjusting the ferrule holder 23 (FIGS. 1, 4). Either gap can be kept constant for several stud sizes or types and the adjustment accomplished by varying the other whichever is more convenient or otherwise suitable. As mentioned above, the bottom gap ($g$ of FIGS. 3a to 3d) is not needed for purposes of venting in the case of comparatively small studs so that in that case the ferrule can be seated on the flat work-piece W and the top gap $h$ alone relied on for venting. Roughly speaking, stud gaps $h$ of appropriate radial width are sufficient for mild steel studs having diameters up to and including approximately three-eighths of an inch, whereas larger studs require in most instances both gaps $g$ and $h$ of areas suitable for the weld at hand. The top venting area around the stud at $h$ is rather important in either case and depends on the stud size and other factors such as the metal of the welding pieces and the duration of the periods of the above described welding cycle.

The volume of the ferrule chamber is often critical; if the chamber is too small, the metal will fill it and its function as a dam and as an arc sustaining expedient would be lost, while a chamber that is too large becomes impractical for the reasons pointed out above. Hence, volume and venting area should be properly correlated for each particular type of weld, depending on all attendant conditions.

Coming lastly to the metal confining or damming and weld shaping function of the ferrule, its dimensions depend, aside from considerations determined by the venting requirements, on the viscosity of the melted metal and its flow on the portions that remain solid; a gap that is too small can be closed by the metal whereas a gap that is too large does not provide the requisite internal pressure but also does not sufficiently dam the metal. In this context it will now be apparent why full reliance on the top gap $h$ is often beneficial, especially in the case of comparatively small studs.

Venting ferrules have heretofore been proposed, but their openings are often insufficient or subject to clogging which detracts from their effectiveness because they then build up pressure which tends to extinguish the arc while oxidation is not with certainty prevented. It has also been found that previously proposed ferrules with vents at or near the bottom of the ferrule which contacts the flat welding piece, are in most instances insufficient because the metal soon closes them. Previously proposed ferrules also fit the stud closely at their top and that region cannot then serve as a vent. Consequently, the gas which cannot escape either way becomes compressed, causes oxidizing, and may occlude in the metal making it spongy. In short, the above discussed detrimental effects of single gaps for larger studs are present. The mere pinking or serrating of the bottom edge of a ferrule that rests on the flat welding piece and closely fits the stud is in many instances not sufficient for a proper functioning of a ferrule used within the present system.

The predetermined ferrule vent according to the invention provides an internal pressure which is not excessive because of generous and unobstructed venting that is properly correlated to the volume of the ferrule chamber. Furthermore, as pointed out above, the welding current is turned off only after the stud is in the metal pool of the flat piece so that oxidation cannot take place at the not yet fully joined surfaces but only, if at all, on the outside of the weld where it can do no harm.

While tipped studs with flat ends are fully satisfactory for most purposes, it was found that a slightly conical face, with the tip at its apex, tends to spread the arc or at least makes it more uniform, and such studs are therefore shown herein.

In frequently used embodiments of the invention the following dimensions and characteristics of operation have been found satisfactory for the stud sizes therein given and it will be understood that similar data can be derived for all practically occurring operating conditions by deducting from a few thoroughly investigated characteristic standard situations, by interpolation therebetween, or extrapolation therefrom, or by the usual shop experimentation if other routine deductions are unsatisfactory. The two following examples are representative of a wide variety of stud and ferrule systems derived in this manner.

For a one-half inch mild steel stud (dimension $d$ of

FIG. 3a) the length t of the tip is one-eighth inch and the tip diameter k1=0.062 inch. The angle of the cone at the tipped stud face is about 10°. The outer diameter of the ferrule is ¾ inch, its height 9/32 inch, its top gap h= 0.0075 inch and its bottom gap g=0.015 inch. The chamber is 9/16 inch in diameter and 11/64 inch high. For a stud and ferrule of these dimensions, the period 3a (FIG. 2) between the closing of switch 30 and the closing of switch 35.2 as well as the period between the opening of switch 41.2 and the opening of switch 35.2 is about one-tenth of a second whereas the longer period corresponding to the delay of relay 41 during periods 3b and 3e is approximately one-fourth to three-quarter of one second. These dimensions are proper for welding studs w to flat steel pieces W which are approximately one-quarter of an inch thick or thicker. For thinner sheets and different metals the dimensions will be somewhat different and to be obtained in accordance with the above outlined procedure.

For smaller studs that are used with ferrules sitting on the flat work-piece, the following dimensions are characteristic. A five-sixteenth inch mild steel stud (dimension k1 of FIG. 3a1) has a tip 3/32 inch long and 0.050 inch in diameter. The angle of the conical stud face is again about 10°. The ferrules for such smaller studs are preferably of the shape shown in FIG. 3a1, with the outer cylinder chamfered at the lower face. For the above 5/16 inch stud, the ferrule of this shape has an outer diameter of ¾ inch and a chamfer diameter of 9/16 inch, and the top gap h1 is 0.0075 inch. The chamber is 0.411 inch in diameter and 11/64 inch high. Again, these dimensions are proper for sheets W which are approximately one-quarter of an inch thick or thicker.

Generally speaking, systems of the present type are preferably operated with direct current with the positive terminal of the source on the flat work-piece W. An alternating welding current is likely to be extinguished when it passes through the zero point of its cycle. However, alternating welding current can be used if compound tips according to FIGS. 12 to 15, or tips of a metal dissimilar to that of their studs, according to FIG. 16, are used, both of which features will now be described.

While, as pointed out above, it is not necessary to use so called "fluxing" material in the technique according to the present invention in order to obtain satisfactory results, there are some exceptional cases where this may be advantageous, especially the case of welding with alternating current. Studs with compound tipped studs according to FIGS. 12 to 15 are advantageous for such purposes in systems according to the present invention.

FIGS. 12 and 13 show a stud w with a tip t to which is frictionally applied a slotted tube f of aluminum which is somewhat shorter than the tip so that it can be easily retained thereon without impairing the function of the tip. As an alternative, FIGS. 14 and 15 show an aluminum disc f1 shaped similar to a spangle and frictionally retained on the tip t.

While tips that are integral with and of the same material as the stud proper produce satisfactory welds in all situations to which the present system can be applied, in certain instances, such as for the above-mentioned purpose of welding with alternating current, it was found advantageous to form the tip t of a metal or metal alloy other than that of the stud proper. This material should have gas gathering properties superior to those of the metal of the stud proper, and also better ionizing properties. Both properties stabilize the arc while the alternating welding current passes through the zero point of the cycle. Titanium was found to be suitable for purposes of such dissimilar studs, or titanium alloyed to increase the electrical resistance of the tip. Aluminum, which has good de-oxidizing properties, was also found to be suitable in some instances.

Such a dissimilar tip is illustrated in FIG. 16 where w1 is the stud which has an axial recess v wherein is inserted a tip tt made of titanium. In a practical embodiment, a half inch mild steel stud, as above described, operates satisfactorily with alternating current if its integral tip is replaced with an inserted titanium tip of 0.050 inch diameter and ⅛ inch long.

It should be understood that the present disclosure is for the purpose of illustration only and that this invention includes all modifications and equivalents which fall within the scope of the appended claims.

I claim:

1. A method of pressurable arc welding to join two work-pieces which comprises the following steps: initially contacting the two work-pieces; applying welding current while maintaining the initial relative position of the two work-pieces to form an arc therebetween which burns off and melts adjacent metal portions thereof; pressing said work-pieces together to join them at said melted portions; and confining said arc and melted metal while regulating escape of gases by holding a refractory chamber throughout the welding around one work-piece at a slight distance from the other work-piece.

2. A method of pressurable arc welding to join a tipped stud to a flat work-piece which comprises the following steps: initially contacting the tip of the stud and the flat work-piece; fixating the relative position of the stud and the flat work-piece as it exists during said initial contacting; applying to said stud and work-piece a welding current immediately after said fixating thereof; retaining said fixation for a time sufficient to initiate an arc by the fusing of said tip—to establish said arc—and to melt adjacent metal portions of the stud and the flat work-piece; thereupon releasing said fixation and pressing said stud towards said work-piece; shortly thereafter, when complete joining of the stud and the flat work-piece is assured, interrupting said welding current; and during the entire welding maintaining the arc, shielding the weld from the atmosphere, and damming metal flow by confining the welding region within a refractory chamber held at a distance from the flat work-piece to regulate the escape of gas.

3. A method of arc welding to join a stud-shaped work-piece to a flat work-piece which comprises the steps of: initially enclosing the welding area of both work-pieces within a refractory chamber that is penetrated by the stud-shaped work-piece and leaves an adjustable uniformly linear gap at the work-pieces; and maintaining said gap throughout the welding; whereby the arc is maintained and shielded from the atmosphere and the metal confined while undisturbed continuous and regulated escape of gas is permitted.

4. Method according to claim 3 wherein said gap is at least partly formed between said flat work-piece and the flat bottom face of a ferrule which contains said chamber.

5. Method according to claim 3 wherein said gap is partly formed by an annular gap between said stud-shaped work-piece and a perforation containing the stud-shaped work-piece and leading into said chamber.

6. A method of pressurable arc welding to join a stud-shaped work-piece to a work-piece that has a flat surface, which comprises the following steps: initially contacting the two work-pieces at portions solidly connected thereto; applying welding current for a period predetermined independently of the magnitude of the welding current while maintaining the initial relative position of the two work-pieces to form an arc therebetween which burns until adjacent metal portions thereof are melted to form a gap; moving said work-pieces through said gap while the welding current remains effective; pressing said work-pieces together to join them at said melted portions, said current being applied during said maintenance of said initial position and for a shorter period thereafter during said pressing together for assuring complete joining of the work-pieces; and impeding said metal flow, maintaining said arc, and shielding the arc from the atmosphere through regulation of the release of gases during the entire welding procedure, by surrounding the stud-shaped work-piece with a refractory chamber which fits the stud loosely and is distanced from the flat surface to provide an annular escape gap for the gases.

7. A method of pressurable arc welding to join a stud-shaped work-piece to a work-piece that has a flat surface, which comprises the following steps: initially contacting the two work-pieces at portions solidly connected thereto; applying welding current for a period predetermined independently of the magnitude of the welding current while maintaining the initial relative position of the two work-pieces to form an arc therebetween which burns until adjacent metal portions thereof are melted to form a gap; moving said work-pieces through said gap while the welding current remains effective; pressing said work-pieces together to join them at said melted portions, said current being applied during said maintenance of said initial position and for a shorter period thereafter during said pressing together for assuring complete joining of the work-pieces; and impeding said metal flow, maintaining said arc, and shielding the arc from the atmosphere through regulation of the release of gases during the entire welding procedure, by surrounding the stud-shaped work-piece with a refractory chamber whose outer rim is held at a slight distance from the flat surface to present an escape gap for the gases.

References Cited in the file of this patent

UNITED STATES PATENTS

| | | |
|---|---|---|
| 1,995,001 | Ito | Mar. 9, 1935 |
| 2,018,263 | Ito | Oct. 22, 1935 |
| 2,096,495 | Hogg | Oct. 19, 1937 |
| 2,110,832 | Hogg | Mar. 8, 1938 |
| 2,115,707 | Crecca et al. | May 3, 1938 |
| 2,413,370 | Palmer | Dec. 31, 1946 |
| 2,416,204 | Nelson | Feb. 18, 1947 |
| 2,441,257 | Candy | May 11, 1948 |
| 2,467,379 | Graham | Apr. 19, 1949 |
| 2,477,765 | Nelson | Aug. 2, 1949 |
| 2,493,283 | Evans | Jan. 3, 1950 |
| 2,518,463 | Graham | Aug. 15, 1950 |
| 2,612,394 | Nelson | Sept. 30, 1952 |
| 2,670,424 | Martin | Feb. 23, 1954 |
| 2,788,435 | Maras | Apr. 9, 1957 |
| 2,864,936 | Eaton | Dec. 16, 1958 |
| 2,897,338 | Haynes | July 28, 1959 |